Sept. 1, 1959 A. H. MANLY 2,902,028
EVAPORATION APPARATUS
Filed July 29, 1958 8 Sheets-Sheet 1

INVENTOR
Arthur H. Manly
BY
Burns, Doane, Benedict & Irons
ATTORNEYS

Sept. 1, 1959

A. H. MANLY 2,902,028

EVAPORATION APPARATUS

Filed July 29, 1958

INVENTOR
*Arthur H. Manly*

BY
*Burns, Doane, Benedict & Irons*
ATTORNEYS

Sept. 1, 1959     A. H. MANLY     2,902,028
EVAPORATION APPARATUS
Filed July 29, 1958     8 Sheets-Sheet 5

INVENTOR
Arthur H. Manly
BY Burns, Doane, Benedict & Swecker
ATTORNEYS

United States Patent Office 2,902,028
Patented Sept. 1, 1959

2,902,028

EVAPORATION APPARATUS

Arthur H. Manly, Baltimore, Md.

Application July 29, 1958, Serial No. 751,684

22 Claims. (Cl. 126—271)

This invention relates to an evaporation apparatus useful in many operations including the production of power and of pure water from impure water such as sea water, brackish water, and the like.

The need for increased water supply for use as potable water or for various other purposes such as irrigation and for certain industrial uses is becoming increasingly critical in many areas. This need is felt especially in certain arid areas where underground water supply is of a highly alkaline or saline character and in areas where sea water or brackish water is available in abundant amounts, but fresh water is at a premium. Other applications are, for example, the production of drinking water from sea water on shipboard or other places where fresh water is not readily available.

It has been proposed to utilize the sun's rays as a source of heat for operating stills to produce pure water or steam which can be used for power production. In these devices, the sun's rays are focused by means of lenses or focusing mirrors upon metallic surfaces which absorb the heat and transfer it to the water to be distilled. It is with such a device that one embodiment of the present apparatus is concerned.

It is an object of this invention to provide an evaporation apparatus which rapidly and efficiently vaporizes large quantities of liquid.

It is another object of the present invention to provide an apparatus of a compact and efficient character for the production of vapor from a liquid which can be utilized, for example, to produce power and fresh water from water which contains high proportions of dissolved solids.

The invention is best understood by reference to the appended drawings which are intended to be illustrative but not to be considered as limited to the exact structure illustrated but to include any modifications which will be apparent to one skilled in the art.

Figure 1:
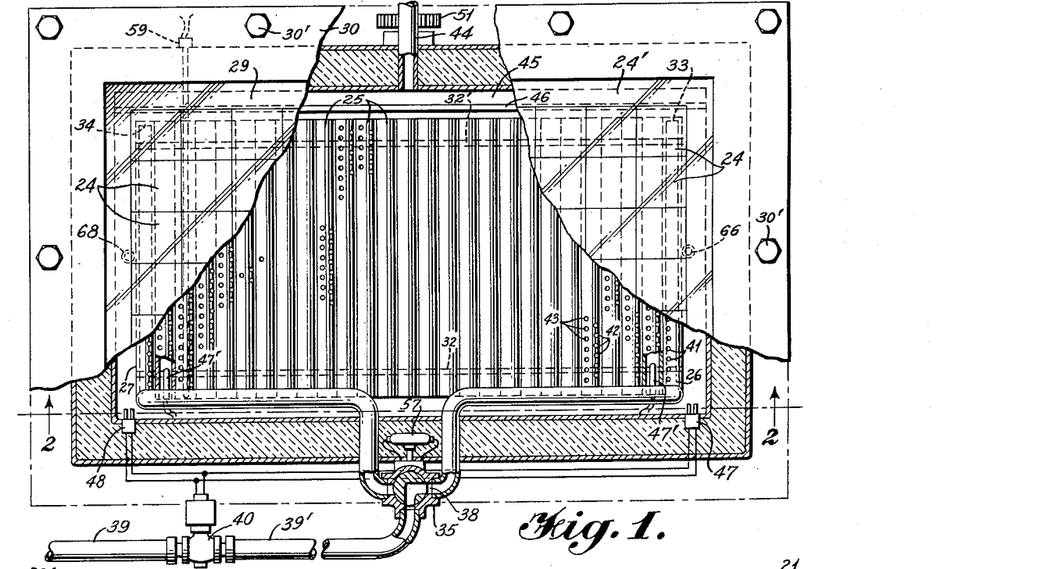
Figure 1 is a plan view of one embodiment of the apparatus of the invention.
Figure 2:
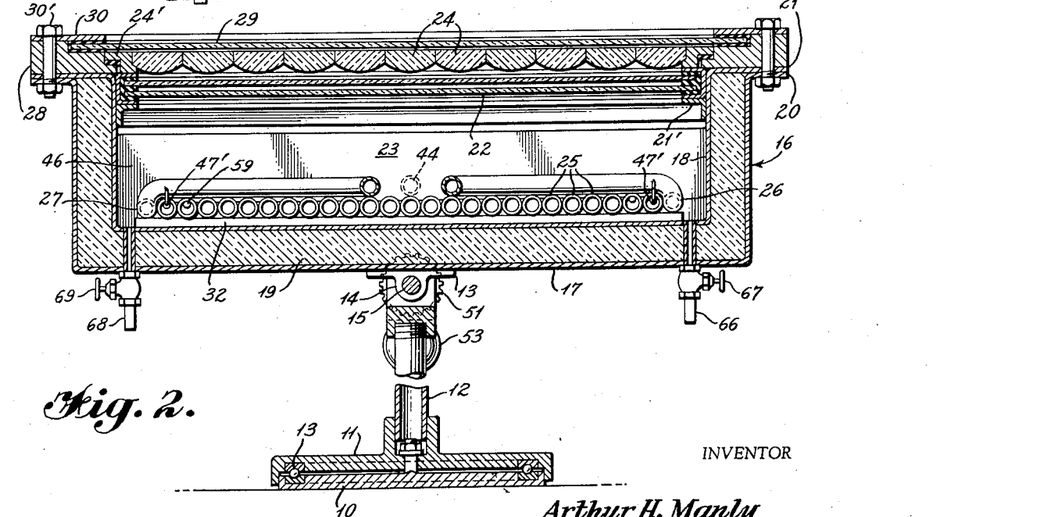
Figure 2 is a side elevation in section taken along the line 2—2 of Figure 1.

Referring to Figures 1 and 2, one embodiment of the apparatus comprises a supporting base 10 upon which is mounted for rotation a pedestal 11, and supporting upright shaft 12, which may be rotated either clockwise or counterclockwise as may be desired, either manually or by power. The pedestal may be provided with a suitable bearing such as thrust bearing 13 for rotation on the base 10. The upper end of the supporting column 12 is provided with supporting head 13' in which is mounted a bearing 14 in which a shaft 15 is mounted for rotation.

The evaporation apparatus or distillation unit 16 comprises an outer shell 17 which is attached by suitable means to the head 13' of the supporting column. An inner shell 18 is provided and the space between the two shells is filled with a suitable insulating material 19. The insulating material is desirably as efficient as possible and must be capable of withstanding the temperatures to which the unit is subjected. Glass wool, fiber glass, rock wool, expanded perlite, expanded vermiculite asbestos, magnesia or other well-known insulating materials may be employed.

Elements 17 and 18 are provided with flanges 20 and 21, respectively. Overlying elements 17 and 18 is a sheet of plate glass 22 supported by angle iron 21'. Plate 22 should be of sufficient thickness and strength to withstand the conditions to which it will be subjected. This glass may be of the reinforced type or of the shatter-proof type of laminated sheets of glass. It should be clear and have good optical characteristics and should be annealed to resist thermal shock. A suitable type of glass is the well-known Pyrex glass of the Corning Glass Company or other equivalent heat resistant glasses. It is preferred that the element 22 be of the double pane type as illustrated. This comprises two or more sheets of glass held apart by spacers at the ends and edges, these forming a vapor-tight seal. The space between the panes is evacuated, thus providing an insulating member to retard conduction of heat from the distillation chamber 23 to the overlying lenses 24.

These lenses are rectangular blocks of a suitable size and focal length so as to focus the sun's rays on the tubes 25, 26 and 27 which make up the heat transfer or evaporator section of the apparatus and which will be described in greater detail hereinafter.

The lenses 24 occupy the area immediately above the evaporator section 23. The edges of the lenses are ground to a close tolerance and are cemented together by any suitable laminating cement or otherwise bound together so as to form a rigid unit. In a large apparatus, any number of these units can be provided for ease in handling. Numerous optical cements are known both of an organic and an inorganic character and the mode of forming the rigid assembly of multiple lenses will be apparent to one skilled in the art. The lens assembly 24 is supported out of contact with element 22 by supporting member 24'.

Overlying the flanges 20 and 21 is a spacing member 28 preferably of an insulating character such as a molded section of synthetic resin generally containing a filler. Illustrative of these are the familiar Bakelite type resins containing wood flour or asbestos flour as fillers. This element 28 is preferably slightly thicker than the vertical dimensions of the lenses 24 so as to allow for a certain amount of thermal expansion without imposing strain which might result in breakage or damage to the assembled system.

Another plate of glass 29 which may be but need not be of the double pane type is placed over the lens assembly and is supported in a recess cut in the element 28. Although this plate 29 could be dispensed with, it is desirable to use it since it tends to prevent damage to the lenses. It can be easily cleaned; and if, after extensive cleaning it becomes scratched so as to interfere with the efficiency of the apparatus, it can be readily replaced with a new plate.

The entire assemblage is held together by any suitable means such as the flange 30 and bolts 30'. Quick-acting clamps or other suitable means could be employed. Suitable gasket material preferably resilient and having insulating characteristics, may be placed between the various matching surfaces in order to provide the necessary seal. Usually, the pressure within the evaporator system is not extremely high but may reach in some types of operation relatively low superatmospheric pressures such as up to about 50 pounds per square inch, so the seal must be effective.

Figure 3:
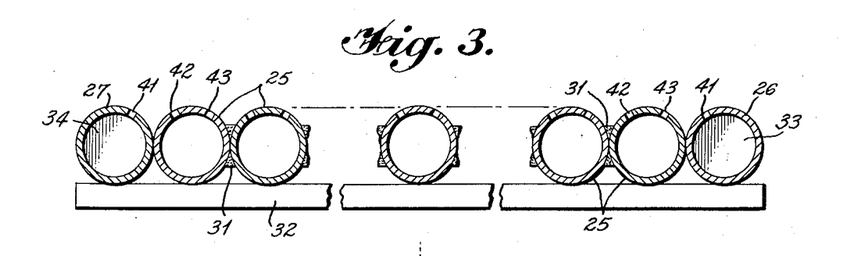
Figure 3 is a detail in perspective of the novel tube system which serves as an evaporator unit.

The evaporator unit comprises a bank of open-ended tubes 25. These tubes are placed side by side and are silver soldered or otherwise permanently attached in heat exchange relationship to each other as shown at 31 in Figure 3. They are attached to metal bars or strips 32 of which there may be several, which lends rigidity to the assembly. The feed tubes 26 and 27 lie close to, but are not attached to, the adjacent tube as shown in Figure 3. This is so that the assembly of open-ended tubes forming the evaporator may be lifted from the solar unit for cleaning or repairs without disturbing the feed tubes. The feed tubes 26 and 27 are plugged at one end as shown at 33 and 34. Tubes 26 and 27 are connected to a solenoid-operated plug valve 35 which is provided with a curved opening 38. The valve is connected to a water inlet line 39. By proper rotation of the plug, the passageway 38 will supply water to either feed tube 26 or feed tube 27 as may be required and as will be more fully explained hereinafter. The raw water feed line 39 is provided with a control valve 40 for regulating the rate of water feed, this in turn being attached to a flexible tube 39' leading to the main feed-water supply line.

Each of the feed tubes 26 and 27 is provided with a multiplicity of spaced apertures 41. This row of apertures is drilled at an angle of about 30° or any desired angle from top center. The adjacent open-ended tube is provided with apertures 42 drilled at a corresponding angle to apertures 41 and which are preferably in staggered relationship to the apertures 41. The tube adjacent to the feed tube is also provided with a series of apertures 43 drilled at a like angle and preferably staggered in relationship to the apertures 42. Each of the other open-ended tubes is provided with apertures 42 and 43 but these are not illustrated for purposes of simplification. Opposite the water inlet side of the device or in any other suitable location is a steam outlet line or steam hose 44 which may lead to a heat engine such as a steam turbine or to suitable coolers and condensers for recovery of the steam condensate as potable water. Outlet line 44 communicates with the space between element 18 and the open ends of tubes 25. This space 45 serves as a collecting manifold for the water vapors generated in the evaporator. A baffle 46 is provided adjacent the ends of tubes 25 and is interposed between the steam outlet line and the ends of the tubes. This baffle preferably extends approximately two-thirds to three-fourths of the height of the distillation section 23. It is sealed to the shell 18 both at the ends and bottom and its purpose is to prevent any water and salts from being swept into the outlet line 44 and thus contaminating the steam. At each end of the device adjacent the bottom of element 18 are wet relays 47 and 48. These relays or their equivalent are connected through a suitable circuit with the motor controlled valve 40. Their purpose will be explained more fully hereinafter.

Figure 5:
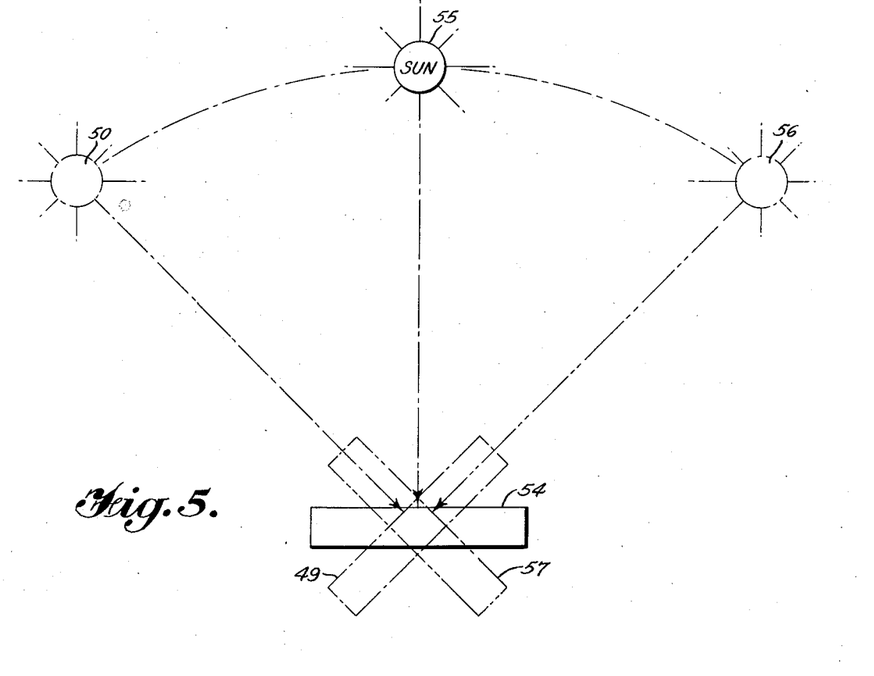
Figure 5 is a schematic illustration showing the position of the solar unit of Figure 4 at various times of the day depending upon the position of the sun.

In operation, the distillation unit is set at an angle to the sun's rays, for example, as shown schematically at 49 in Figure 5 when the sun is in the position shown at 50. This angle is adjusted by rotating the shaft 15, for example, by means of the gear and motor assembly 51, 52 and 53 until the rays of the sun strike the lens assembly at an angle approximately perpendicular thereto. The motor and gear assembly is of a type which will rotate the shaft 15 at a rate corresponding to the movement of the hour hand of a clock so that from the time the operation is begun in the morning until it is stopped in the evening the angle of incidence of the sun's rays on the assembly is automatically adjusted throughout the day. Any other suitable means for accomplishing this may be provided.

Various positions of the solar unit during the day will be noted from Figure 5. For example, at noon the unit will be in a position shown at 54 when the sun is at 55. In the afternoon when the sun is at 56, the unit will be in the position shown at 57. Axis 15 is in a generally north and south line in the morning and evening, although this will deviate therefrom due to variations in the earth's orbit around the sun at the different seasons of the year and the geographical location of the plant.

In order to compensate for the change in the earth's orbit at various seasons and the geographic location of the plant, the unit is rotated around axis 12 by turning element 11 by any suitable means, not shown, to the proper position necessary to keep the distillation unit turned toward the sun. The means for mounting the distillation unit for effecting the pivotal movement around axis 15 and for rotating the device around axis 12 to the proper position to keep the face of the distillation unit normal to the sun's rays, forms no part of my invention, per se, since any suitable means known to those skilled in the art may be used. My invention lies in the distillation or evaporator unit itself.

Assuming that the operation begins with the sun shown as at 50 and the unit in the position at 49 of Figure 5, the solenoid valve 35 is set with the opening 38 in the position as shown. Water which is filtered to remove any solid particles that might tend to plug the apparatus passes through line 39, valve 40 and aperture 38 into line 26 and is sprayed through the apertures 41. The water cascades downwardly over the tubes 25 which are being heated by the sun's rays focused on the evaporator section by the lenses 24. The water sprays out over the tubes and some of it passes into the interior of the tubes through the apertures 42 and 43. Since the tubes 25 are of metal such as copper or any other good heat conductor, including stainless steel and the like, not only the portion of the tubes exposed to the sun's rays, but the interior of the tubes are heated by conduction. Consequently, water is evaporated both on the outer surface as it cascades over the metal and also from the interior of the tubes 25 from whence steam passes through the open ends into the upper portion of the distillation zone. The steam passes over baffle 46 into the manifold space 45 and out through steam outlet line 44.

The rate of flow of water is adjusted so that all of the tubes are wetted with the possible exception of the last few of the lower tubes. If the water is not completely evaporated before it reaches the end of the unit adjacent the wet relay 47, it causes the relay to operate which in turn causes motor control valve 40 to close somewhat to reduce the rate of feed water. A thermostatic control 47' is mounted on a tube adjacent the lower end of the tube chest so that when the water supply is reduced to too low a value the temperature of the tube will rise and cause the valve to open slightly. Thus, the supply of feed water will automatically be adjusted to the maximum rate for the heat capacity of the unit. It must be realized that various factors will influence the capacity of the unit. These may include the condition of the atmosphere, the season of the year, etc. An important factor is the accumulation of solids on the tubes during the course of an operating cycle. This tends to insulate the tubes and reduce heat transfer efficiency, and consequently the rate of evaporation, so that the feed water supply must be adjusted accordingly.

Drainage tubes 66 and 68 provided with valves 67 and 69 serve as a means for removing excess water from the apparatus.

This operation continues until the unit reaches the position shown at 54 in Figure 5. As the unit passes over top dead center, the microswitch 57 operates the solenoid valve 35 causing the plug to rotate so as to connect tube 27 with tube 39. Water is then sprayed from tube 27 and cascades downwardly in the direction which will be evident as the unit moves to the position shown at 57 in Figure 5.

Feed line 39 is a flexible tube connected with the main water supply line, so as to compensate for the movement of the unit during the day. The steam line 44 is also a flexible tube or hose.

Figure 4:
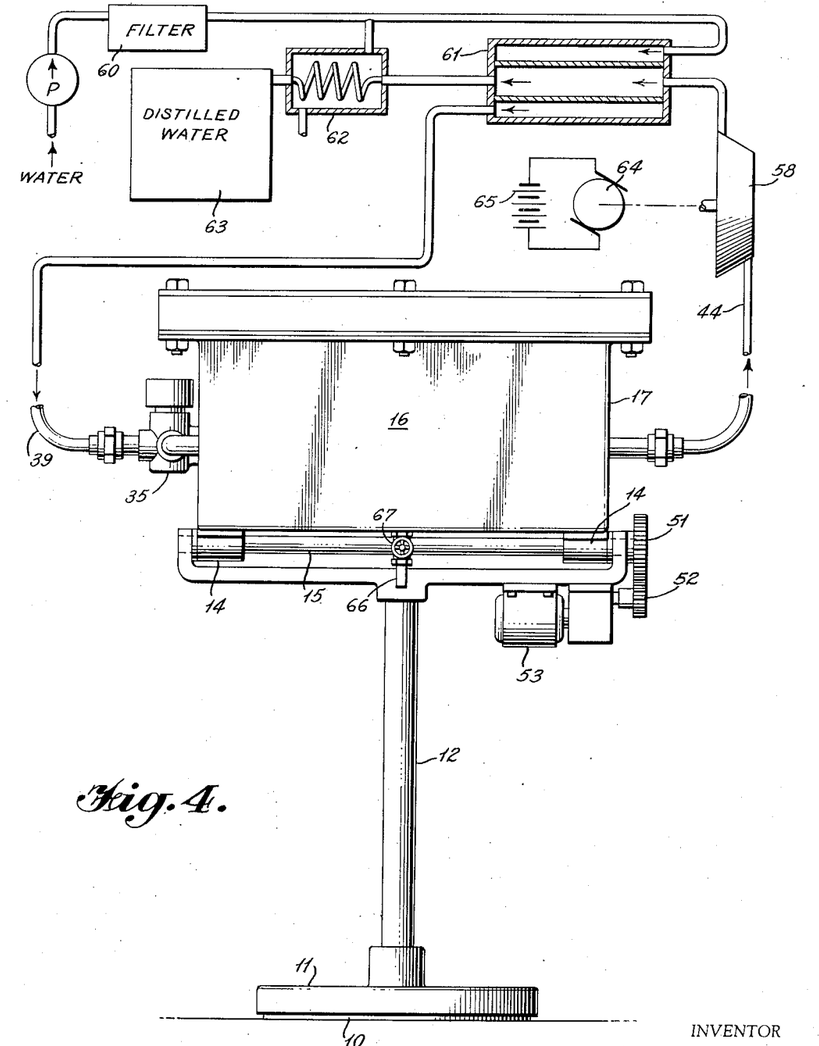
Figure 4 is a schematic illustration of the apparatus showing one mode of operation and showing one form of the solar unit from an end view.

As illustrated in Figure 4, steam line 44 may be connected to a heat engine or steam turbine 58 which may furnish power for any desired purpose. Because the operation may not be entirely constant due to clouds passing over the sky or because of cloudy days, one desirable operation is to connect the turbine with a generator 64 which in turn charges storage batteries 65 which can be drawn upon as a source of power, for example, to operate the necessary feed pumps.

It is desirable to provide the tubes 25 with an auxiliary electrical resistance element 59 (only one of which is shown for purposes of simplification). These may be placed in every tube, or in alternate tubes, or any other satisfactory arrangement. At times when the sun passes under clouds for a few minutes, these elements can be heated by current supplied from the storage batteries 65 so that the operation can be continued without interruption. Likewise, the operation can be continued during hours of darkness by use of the electrical energy produced during the day.

The raw feed water is first passed through a filter 60 and a heat exchanger 61 wherein it is passed in indirect heat exchange between steam and steam condensate from turbine 58, and if necessary, through an additional heat exchanger 62. By preheating the raw feed water, the capacity of the unit is considerably increased. The steam is condensed by passage through the turbine 58 and the heat exchangers 61 and 62, and the fresh water is collected in a storage tank 63. It is obvious that the steam from line 44 could be condensed directly if it is not desired to use it for power purposes. It is likewise evident that one unit could be used as a distillation unit, operating at low pressures, and a second unit operating at higher pressures for power purposes could be used, the latter using the pure water produced by the first unit as its feed.

The unit can be made in any desired size and the particular construction, size and focal length of lenses, etc., will be in part governed by the size. In one small model useful for producing potable water, the distillation unit comprised 32 open-end copper tubes, one-half inch in diameter and having a wall thickness of 0.35 inch, these being silver soldered together and attached to two strips of steel running lengthwise of the cascade element to lend further rigidity thereto. The tubes were 12 inches long with 1/32 inch holes, 1/8 inch apart and in staggered relation to each other. These holes were drilled at an angle of about 30° off center. The feed tubes were of similar dimension and the holes in the tubes were of similar size. The distillation compartment was two inches deep, 20 inches wide and 24 inches long. The lenses were one inch square and about 1/4 inch thick and had a focal length of two inches (20 diopter lens). The interior element 18 was of stainless steel. The exterior element 17 was of sheet metal and the device was insulated with two inches of rock wool.

It will, of course, be apparent that salts remaining as a residue from the distillation of water will accumulate on the cascade surfaces, on the interior of the tubes and in the perforations. This accumulation can be removed by removing the plate glass and lens assembly and lifting the tube chest from the distillation zone 23. The accumulated salts can then be removed by any suitable means such as by a brush or by chemical means, after which they can be flushed with water if necessary and the tube chest returned to the apparatus for further use.

As an adjunct to the apparatus, reflecting mirrors may be used to collect and partially concentrate the sun's rays onto the lenses, and these in turn complete the focusing of the rays on the evaporating surfaces, thereby increasing the heat input to the unit with resultant increase in capacity. These should preferably be mounted so that the lenses receive both the direct rays from the sun and the partially focused rays from the mirror.

Figure 6:
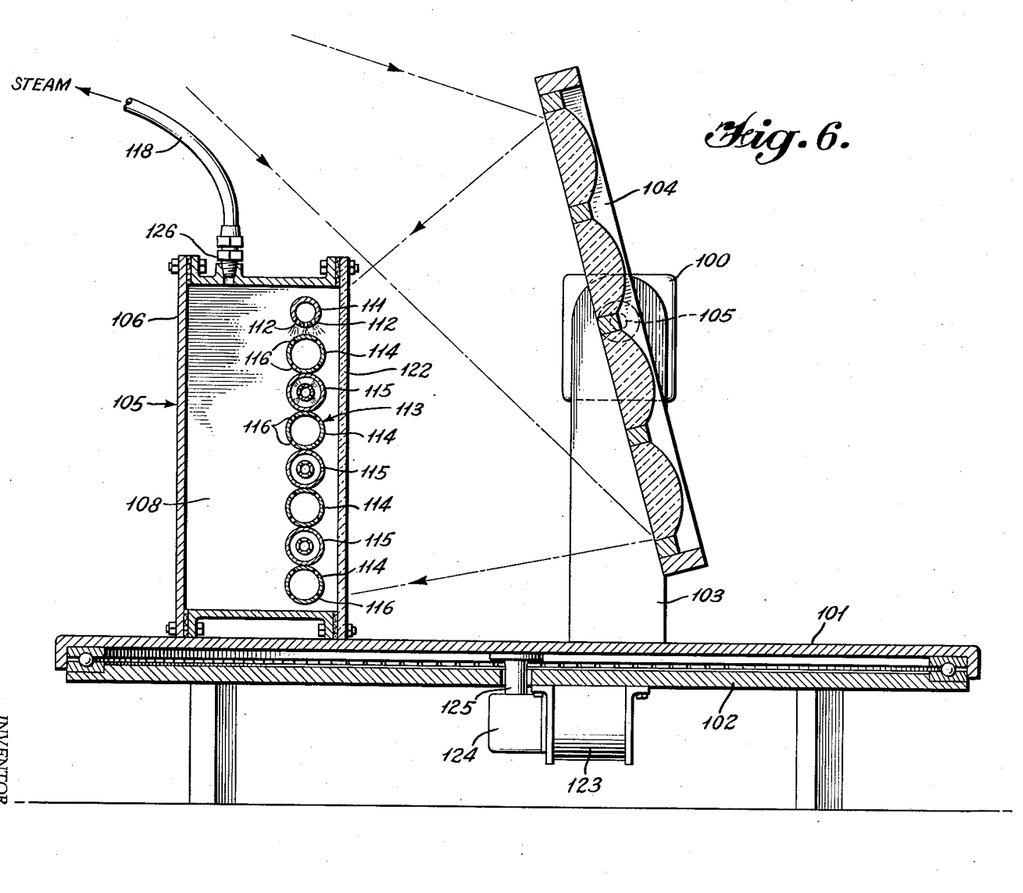
Figure 6 is a side elevation in section of an alternative embodiment of the apparatus of the invention.
Figure 7:
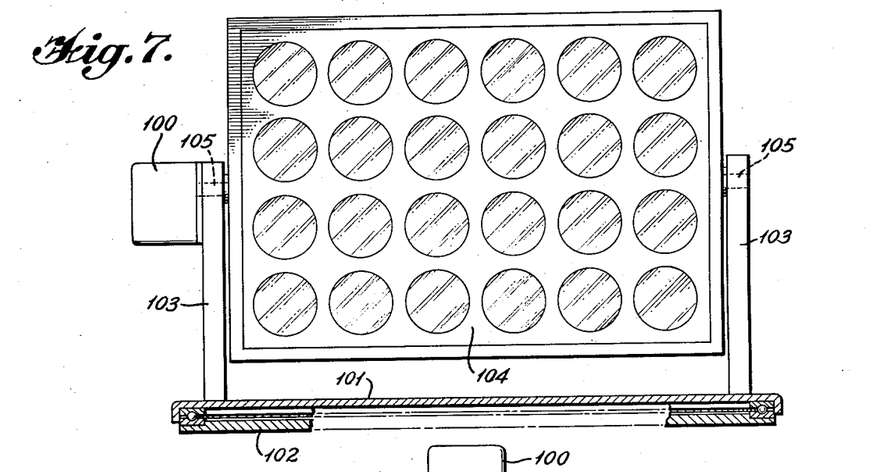
Figure 7 is an elevation showing the solar unit focusing mirror of the apparatus of Figure 6.
Figure 8:
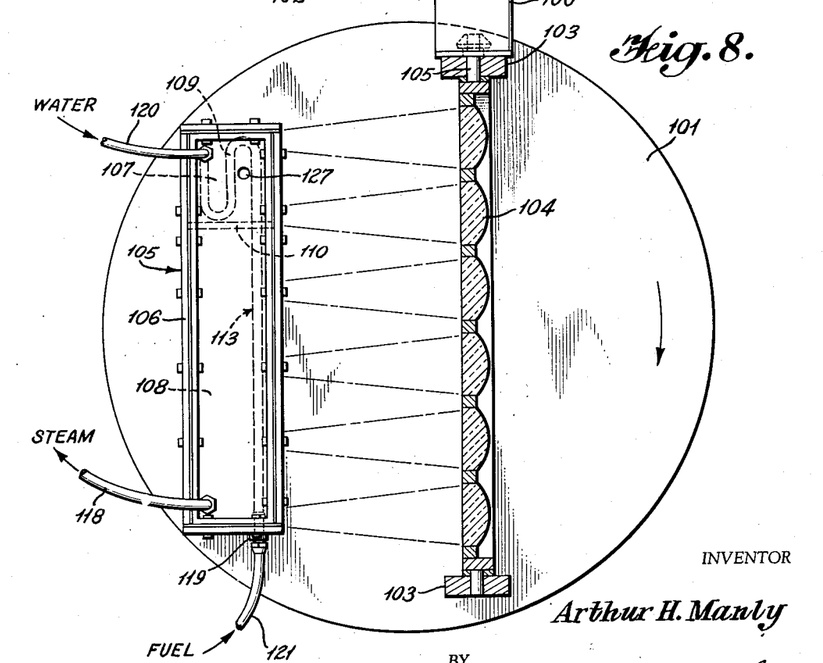
Figure 8 is a plan view partially in section of the apparatus of Figure 6.

Illustrated in Figures 6 through 8 is an alternative embodiment of the apparatus of the invention in conjunction with a modified solar unit. In the apparatus of Figure 6, a pedestal 101 is rotatably mounted on a supporting base 102. A clock motor 123 which may be electric is secured to the underside of base 102 to impart rotation to the pedestal 101 through a suitable gear reduction unit 124 and shaft 125. The pedestal 101 supports a pair of spaced posts 103 between which a focusing mirror 104 is mounted on axle 105 for rotation about a horizontal axis. The axle 105 is rotated by a clock motor 100 mounted on one of the posts 103.

Also mounted on the pedestal 101 at a position spaced horizontally from the mirror 104 is an alternative form of evaporation apparatus 105 having a housing 106. The walls of the housing 106 are bolted together with suitable gaskets sandwiched therebetween. The housing is substantially pressure-tight at operating pressures, and if desired, may be insulated to minimize heat loss in the same manner as the distillation unit 16. The housing 106 is divided into a preheating zone 107 and a main heating zone 108 by a transverse partition 110. Water or other liquid to be evaporated is introduced into the preheating zone through a flexible line 120 and is passed through a preheating coil 109 before admission into a water-distribution manifold 111 which extends across the top of the main heating zone. The manifold 111 is provided with a plurality of apertures 112 spaced horizontally throughout its length to emit a downward spray of water as best seen in Figure 6.

Situated below the manifold 111 is an evaporator unit 113 which comprises a plurality of heat-conductive tubes arranged in mutually parallel relationship to form a vertical tube bundle. Only one bank of tubes is employed in the unit 113. A direct heat exchange relationship is maintained between adjacent tubes which are preferably in contact throughout their length and attached to one another by silver soldering or the like. The tube bundle includes evaporator tubes 114 and combustion heater tubes 115 interspersed among the evaporator tubes. Each of the combustion heater tubes is connected to a fuel inlet 119 which is served by a flexible fuel line 121.

The evaporator tubes 114 and combustion heater tubes 115 are not shown in detail. These elements, however, are identical in structure and manner of operation and are removably mounted in the housing in the same manner as the evaporator tubes 143 and combustion heater tubes 142, respectively, of the apparatus shown in Figure 10 which is fully described hereinafter, except that the tubes 114 contain no metallic mesh. Further, the construction and arrangement of the preheating coils 109, the partition 110 and the manifold 111 are the same as the corresponding elements shown in Figure 10.

The evaporator tubes 114 are open at both ends and have radial apertures 116 extending through the tube walls to increase the heat exchange contact area between the tubes and water to be evaporated which is sprayed from the manifold 111 and cascades by gravity over the tube bundle. A portion of the cascading water enters the apertures 116. Thus, water films are formed on both the exterior and interior surfaces of the evaporator tubes.

Fuel entering each of the combustion heater tubes 115 is ignited as by a suitable pilot light, thus heating both the heater tubes and the evaporator tubes. The exhaust from the heater tubes is discharged past the partition 110 into the preheating zone 107 around the preheating coil 109 and through exhaust outlet 127, thereby preheating the incoming water to a temperature of about 180° F. If desired, the water may be preheated to the boiling point.

The housing 106 on the side nearest the mirror 104 is provided with a transparent glass wall 122. The properties of the glass are desirably the same as given for the plate 22. The pedestal 101 and the shaft 105 are rotated in the conventional manner to maintain the mirror 104 in position to receive the sun's rays and focus such rays through the glass 122 onto the tubes comprising the evaporator unit 113, thereby heating the evaporator unit. Thus, the heat supplied by the sun supplements the heat provided by the combustion heater tubes 115 to effect maximum vaporization of water.

It will be readily apparent that the combustion tubes may be deactivated and the evaporator unit operated by solar heat alone. Conversely, the unit can be operated by heat from the combustion tubes alone without solar heat.

Steam is removed from the evaporator unit by a flexible steam line 118 which is connected to an outlet fitting 126. If desired, a water drainage outlet may be placed in the bottom of housing 106.

A wet switch, not shown but similar to that of Figure 1, is positioned at the bottom of the housing 106 which is actuated when all of the water is not vaporized prior to reaching the bottom of the housing. The wet switch is connected by any suitable circuitry to a valve, not shown, which controls the rate of feed of the inlet water through line 120. Further, there is placed within the housing 106 a thermostatic control element which is similar to that of Figure 1 and is connected by suitable circuitry to the inlet water feed control valve. Thus, when the rate of water flow is too fast, the wet switch is actuated to decrease the flow rate; and when the rate of flow is too slow and the unit overheats, the thermostatic element is actuated to increase such rate.

Figure 9:
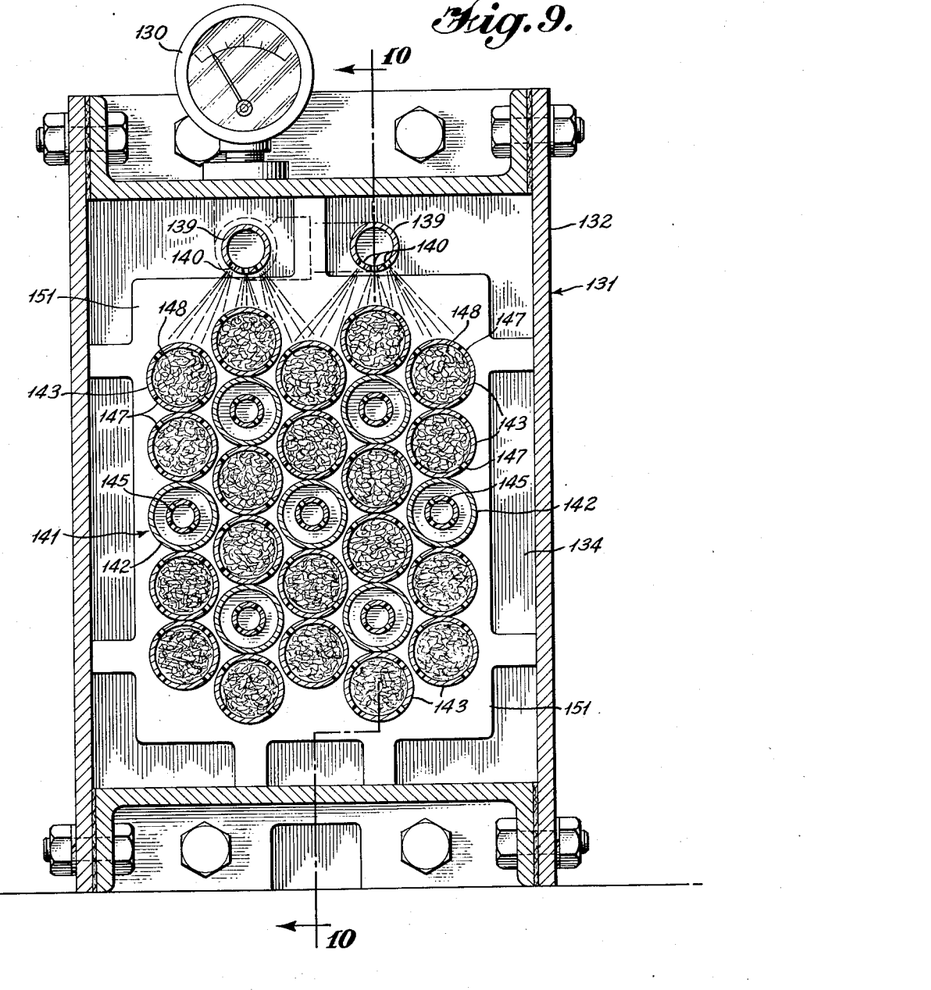
Figure 9 is a side elevation in section showing an alternative form of the evaporator unit.
Figure 10:
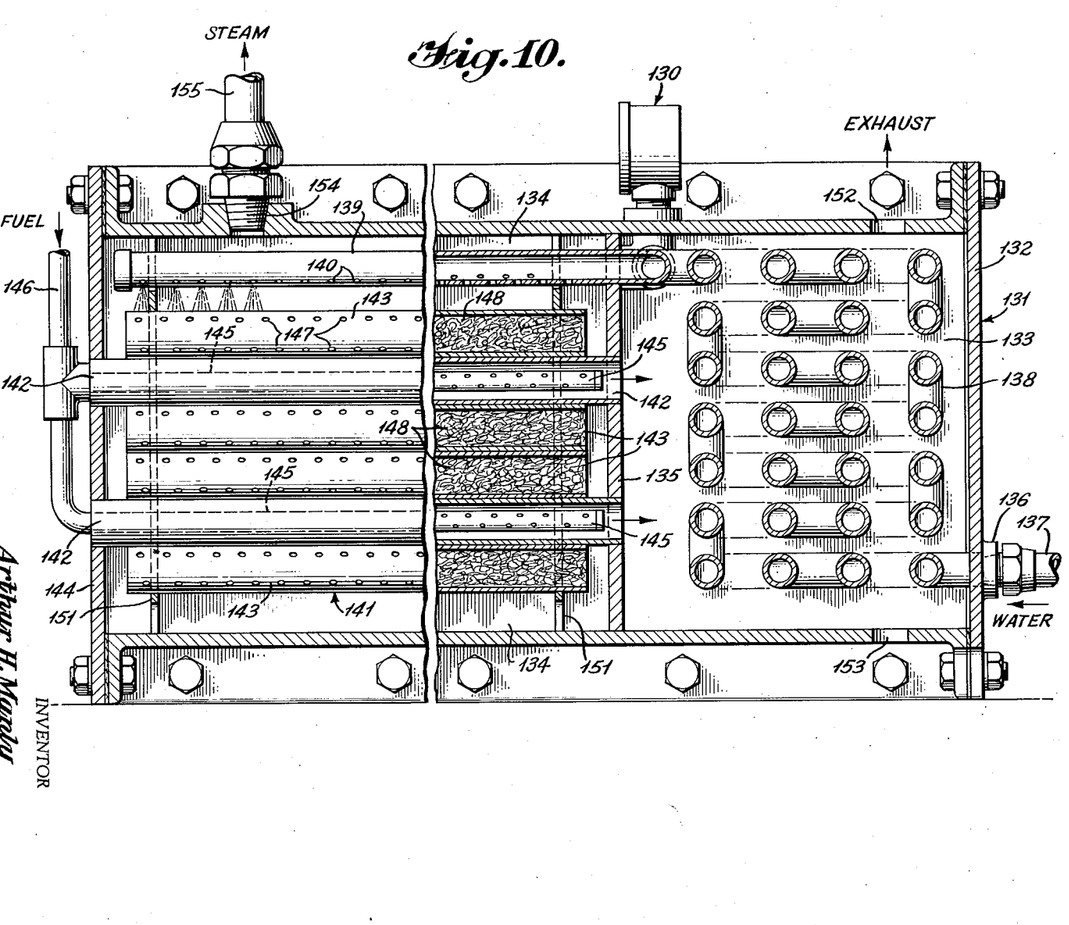
Figure 10 is a vertical section taken along the line 10—10 of Figure 9.

A high capacity evaporator assembly 131, which embodies multiple vertical rows of tubes and which is heated by combustion heater tubes alone without the use of solar heat, is shown in Figures 9 and 10. The assembly 131 consists of a housing 132 which is substantially pressure-tight at operating pressures. The housing walls are bolted together with suitable gaskets therebetween. If desired, the housing may be insulated such as by the use of double walls with insulation therebetween substantially as shown and described in connection with the apparatus of Figure 2. The housing 132 is divided into a preheating zone 133 and a main heating zone 134 by a partition 135. The preheating zone 133 has a water inlet 136 which is served by an inlet line 137 which is connected in fluid communication with a preheating coil 138. The coil 138, in turn, is connected to a pair of water-distribution manifolds 139 which extend through the partition 135 and along substantially the entire length of the upper portion of the main heating zone 134. Each manifold 139 has a plurality of spaced apertures 140 extending through the lower wall thereof to permit water to be sprayed downwardly over the evaporator unit. Depending upon the width of the evaporator unit, additional manifolds 139 may be provided as required. At the juncture between the preheating coil 138 and the manifolds 139 is connected a conduit leading to a fluid pressure gauge 130 which is mounted on the outside of the housing 132.

Situated in the heating zone 134 below the manifolds 139 is an evaporator unit 141 which includes a bundle of tubes arranged in a plurality of horizontally spaced vertical rows. Within each vertical row, the tubes are arranged in aligned, parallel relationship in heat exchange relationship. Preferably, each two adjacent tubes are in contact throughout their length and silver soldered or otherwise connected to one another. Each row of tubes comprises one or more combustion heater tubes 142 interspersed among a plurality of evaporator tubes 143. Adjacent rows of tubes are slightly spaced from one another to permit water to pass therebetween. The tubes in each row preferably are also staggered with respect to the tubes in the immediately adjacent rows. It will be apparent that many different arrangements of heater and evaporator tubes within the evaporator unit may be satisfactorily employed.

Each of the combustion heater tubes 142 is fixed at one end to an end wall 144 of the housing 132. The other ends of the tubes 142 fit into openings in the partition 135 in removable but pressure-tight connections. Any suitable sealing means may be provided at these connections. Extending throughout most of the length of each of the heater tubes 142 is a perforated burner 145 which is connected to a fuel inlet line 146. Desirably, one or more pilot lights are provided to ignite the burners. Alternatively hot combustion gases may be passed through the burners 145 with no actual burning in the tubes.

Each of the evaporator tubes 143 contains a plurality of spaced apertures 147 which extend radially through the tube wall. It is preferred that the apertures in each tube be staggered relative to the apertures in adjacent tubes. Each of the tubes 143 is filled with heat conductive metallic mesh 148. Thus, water may enter the apertures 147 to form a film on the interior surface of the tubes and on the metallic mesh to increase the heat exchange contact area between the tubes and the water. If desired, however, the metallic mesh may be omitted. The tubes 143 are removably mounted in brackets 151 which properly position the tubes in the tube bundle 141. Preferably, the entire tube bundle 141 is removable from the housing by removal of the wall 144 which is bolted to the housing. Thus, the tube bundle may be periodically removed from the housing and cleaned.

Exhaust from the heater tubes 142 is discharged into the preheating zone 133 to preheat the water passing through the coils 138. The exhaust gases escape through an exhaust outlet 152 in the top of the housing 132. A draft vent 153 is provided in the lower portion of the housing.

In operation of the device shown in Figures 9 and 10, water is introduced through the line 137 into the preheating coils 138 where it is preheated to a temperature of about 180° F. and if desired to 212° F. by the exhaust gases from the heater tubes 142. The water then passes into the water-distribution manifold 139 and is sprayed downwardly over the tube bundles 141 which are heated by the heater tubes. Water cascades downwardly over the tube bundles as a film. Some of the water enters the apertures 147 and forms a film on the inside surfaces of the evaporator tubes and on the metallic mesh within the tubes. The water is rapidly vaporized on the hot tubes to form steam which collects in the heating zone around the tubes and is discharged through outlet 154 and steam line 155.

Preferably, a valve, not shown, is positioned in the water inlet line 137 and is controlled by a wet switch and a thermostatically controlled switch which are situated in the heating zone 134 and operate in the same manner as previously described in connection with the evaporation apparatus 105 shown in Figure 6. If the flow of water across the evaporator unit is too heavy, the wet switch is actuated to decrease the rate of flow through the inlet line. Conversely, if the flow across the evaporator unit is too light and causes over-heating of the unit, the thermostatic switch is actuated to increase the rate of flow through the inlet line.

Figure 11:
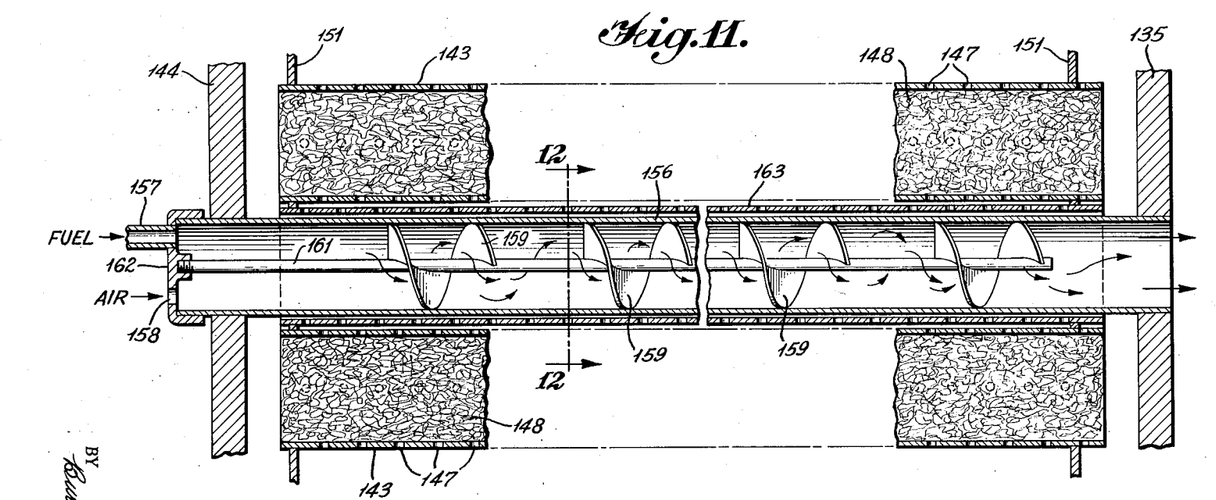
Figure 11 is a vertical section showing a modified form of heating tube.
Figure 12:
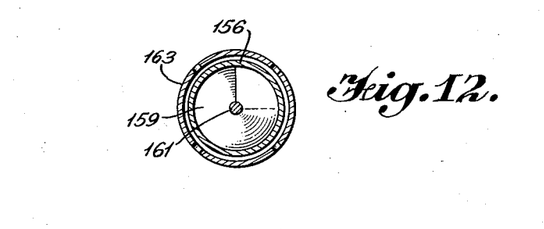
Figure 12 is a vertical section taken along the line 12—12 of Figure 11.

Depicted in Figures 11 and 12 is an alternative form of combustion heater tube, which may be utilized with either the apparatus shown in Figure 6 or that shown in Figure 9. The burner tube 156 consists of a non-apertured tube which is mounted between the exterior wall 144 and interior partition 135 of the housing 132 in the same manner as the tubes 142. The tube 156 has a fuel inlet 157 and an air inlet 158. The fuel and air mixture may be ignited within the tube by a pilot light or other means, not shown. The hot combustion gases pass longitudinally through the tube 156 past helical baffles 159 which are mounted on a rod 161 which, in turn, is connected to the end cap 162 of the tube and extends axially through the tube. The function of the baffles 159 is to decrease the rate of flow of the gases through the tube and create turbulence, thus more effectively utilizing the heat of the combustion gases. An evaporator tube 163 is mounted outside of the heater tube 156 in concentric relationship thereto. When water cascades down the tube bundle, it is vaporized by contact with the surfaces of the evaporator tubes 143 in the manner previously described. The provision of an apertured evaporator tube around the combustion heater tube further increases the heat exchange area on which water may be vaporized.

A film of water is formed on the exterior surface of the tube 163 and some water passes through the apertures in the tube 163 to form films on both the interior surface of the tube 163 and the exterior surface of the combustion tube 156. When combustion tube 156 is substituted for the combustion tubes 142 in the apparatus of Figure 10 or of Figure 6, the capacity of the evaporator unit is materially increased. It will be understood that the heater tube 156 may be employed without the surrounding evaporator tube 163.

Either of the devices 105 (Figure 6) or 131 (Figure 9) may be substituted for the device 16 in the power and distillation circuit shown in Figure 4.

In any of the forms of apparatus described hereinbefore, it is evident that the number, size and length of tubes will vary with the size of the equipment. It is also evident that the water may be sprayed onto the tubes at points intermediate the end of the evaporator unit by supplying additional feed tubes. This would be particularly true in the case of large units several feet long.

The metal parts which will come in contact with the hot feed water should be of a corrosion resistant material. The tube chest is preferably made of copper or some other heat resistant material having high heat conductivity. Glass tubes could be used but are less desirable because the heat conducting characteristics of glass are somewhat inferior to metal.

There has been illustrated and described certain preferred embodiments of the apparatus according to the present invention. It is apparent, however, that modifications may be made by those skilled in the art without departing from the scope of the invention as embraced by the appended claims.

This is a continuation-in-part of my co-pending application, Serial Number 527,857, filed August 11, 1955, entitled "Solar Still and Power Plant."

I claim:

1. A solar distillation unit comprising a recessed exteriorly insulated shell, transparent means sealing said recess to form a heating zone, a removable evaporator unit positioned in said heating zone, means positioned above the heating zone for focusing the sun's rays on the surface of said evaporator unit, feed water inlet lines in fluid communication with said heating zone located adjacent each end of said evaporator unit and including means for spraying feed water over the surface of said evaporator unit, means to tiltably mount said unit to respectively raise and lower the ends thereof, valve means operable to supply feed water to the uppermost of said feed lines when the unit is tilted at an angle, means for switching said valve to supply the water to the other of said feed lines when the angle of tilt is reversed, said evaporator unit comprising a plurality of open-ended tubes lying transverse the normal flow of water, adjacent tubes being in close proximity, means for maintaining said tubes in close proximity to form a rigid removable structure, said open-ended tubes being provided with apertures to permit a limited flow of the water cascading over said tubes into the interior thereof, a vapor outlet from the heating zone and means positioned between said heating zone and said vapor outlet for preventing flow of feed water from said heating zone into said vapor outlet.

2. A solar distillation unit comprising a recessed exteriorly insulated shell, a transparent cover, means for sealing said cover to said shell in pressure-tight relationship to form a heating zone, a water inlet and a vapor outlet, a removable evaporator unit positioned in said heating zone, means for focusing the sun's rays on the surface of said evaporator unit, said evaporator unit including a tube bundle comprising a plurality of aligned perforated open-ended tubes, a water distributing manifold adjacent one end of the heating zone, said manifold and said tubes being arranged so that water, when introduced, will cascade over said tubes from one end of the unit to the other, said tubes lying transverse the path of flow of the water.

3. The apparatus of claim 2 wherein adjacent open-ended tubes are sealed together.

4. The apparatus of claim 2 wherein the open-ended tubes comprise a plurality of apertures throughout the length thereof and being located between the top center of the tube and the point of contact with an adjacent tube.

5. The apparatus of claim 2 wherein each tube comprises two rows of apertures, one on each side of the top center of the tube.

6. The apparatus of claim 5 wherein alternating rows of apertures in said tubes are in staggered relation to each other.

7. The apparatus of claim 2 wherein the means for focusing the sun's rays comprises a plurality of lenses mounted above the transparent sealing means, said lenses having a focal length to produce a substantially maximum focus of the sun's rays on said open-ended tubes throughout their length.

8. The apparatus of claim 7 comprising means for regulating the flow of water over said tubes whereby substantially all of said tubes are covered with a film of water during operation.

9. The apparatus of claim 2 wherein a portion of the tubes is equipped with auxiliary heating means.

10. In a solar distillation apparatus comprising a solar evaporator mounted to follow the course of the sun during the day, the improvement comprising a solar distillation unit comprising a recessed exteriorly insulated shell, a transparent cover, means for sealing said cover to said shell in pressure-tight relationship to form a heating zone, a water inlet and a vapor outlet, a removable evaporator unit positioned in said heating zone, means for focusing the sun's rays on the surface of said evaporator unit, said evaporator unit including a tube bundle comprising a plurality of aligned perforated open-ended tubes, a water distributing manifold adjacent one end of the heating zone, said manifold and said tubes being arranged so that water, when introduced, will cascade over said tubes from one end of the tube bundle to the other, said tubes lying transverse the path of flow of the water.

11. A distillation unit for use in a solar distillation apparatus which comprises an exterior shell, an interior matching shell in spaced relationship thereto, insulating material within the space therebetween, a lens system detachably mounted over said interior shell in vapor-tight relationship thereto, a water inlet line located adjacent one end of the interior shell and in fluid communication therewith, said line being connected to a valve and being provided wtih a plurality of apertures for producing a spray of water, said apertures being in a line parallel to the end of the inner shell and set at an angle directed upwardly and toward the opposite end of said shell, a removable bundle of heat-conductive tubes lying in close proximity to each other, said bundle and said inlet line being arranged so that water from said inlet line will cascade from one end of the bundle to the other, said bundle comprising open-ended tubes provided with rows of small apertures transverse the flow of water to permit a portion of the water to enter the interior of the tubes, and means for removing steam from said unit.

12. An evaporation apparatus comprising a substantially pressure-tight housing providing a heating zone therewithin, a manifold positioned in said housing to distribute liquid into said heating zone, said housing having a vapor outlet, an evaporation unit positioned in said heating zone and including a tube bundle comprising a plurality of perforated heat-conductive evaporator tubes, means to heat said evaporator unit, said manifold and said tubes being arranged so that liquid when introduced through said manifold will cascade over said tubes to be vaporized, some of the liquid passing over the exterior surfaces of the tubes and some of the liquid passing through the perforations in the tubes onto the interior surfaces thereof, said tubes lying transverse the flow of liquid.

13. The apparatus of claim 12 wherein said heating means includes at least one combustion heater tube mounted in heat exchange relationship with said evaporator tubes.

14. The apparatus of claim 12 wherein said heating means comprises in combination means for focusing the sun's rays on the surface of said evaporator unit, at least a portion of one wall of said housing being transparent to admit the sun's rays, and auxiliary heating means positioned in said evaporator unit.

15. The apparatus of claim 14 wherein said auxiliary heating means comprises at least one combustion heater tube mounted in heat exchange relationship with said evaporator tubes.

16. The apparatus of claim 15 wherein each combustion heater tube is positioned inside one of said evaporator tubes.

17. The apparatus of claim 16 wherein each combustion heater tube contains baffle means mounted therein.

18. An evaporation apparatus comprising a substantially pressure-tight housing providing a heating zone therewithin, a liquid distributing manifold positioned in said housing, an evaporator unit positioned in said heating zone and including a bundle of substantially parallel tubes, said tubes being positioned relative to said manifold so that liquid when introduced through said manifold will cascade over said tubes, said tubes lying transverse the flow of liquid, said tube bundle including combustion heater and evaporator tubes arranged in close heat exchange relationship, each evaporator tube being heat conductive and having a perforated wall to permit a portion of the liquid to enter the interior thereof, and means for removing vapor from said housing.

19. The apparatus of claim 18 wherein said tubes are arranged in a plurality of slightly spaced vertical rows.

20. The apparatus of claim 18 further characterized by means for focusing the sun's rays on the surface of said evaporator unit, at least a portion of one wall of said housing being transparent to admit the sun's rays.

21. An evaporator unit for use with means to heat said unit and means to supply liquid to said unit which comprises a plurality of heat conductive tubes arranged in a bundle over which liquid may be cascaded, each two adjacent tubes being in direct heat exchange relationship with each other throughout a substantial portion of their length to facilitate heating of the tube bundle, at least a portion of the tube bundle having perforated walls to permit a portion of the liquid to enter the interior thereof thereby increasing the surface contact between said tubes and the liquid.

22. An evaporation apparatus which comprises an evaporator unit, means to supply liquid to said evaporator unit and means to heat said evaporator unit, said evaporator unit comprising a plurality of heat conductive tubes arranged in a bundle over which liquid may be cascaded, each two adjacent tubes being in direct heat exchange relationship with each other throughout a substantial portion of their length to facilitate heating of the tube bundle, at least a portion of the tube bundle having perforated walls to permit a portion of the liquid to enter the interior thereof thereby increasing the surface contact between said tubes and the liquid.

No references cited.